United States Patent Office 3,641,088
Patented Feb. 8, 1972

3,641,088
AROMATIC o-TRIORGANOSILYL-DIORGANO-AMINO COMPOUNDS AND PROCESS
Walter Fink, Ruschlikon/ZH, Nidelbadstr. 99, Zurich, Switzerland
No Drawing. Filed Feb. 20, 1969, Ser. No. 801,178
Int. Cl. C07f 7/10
U.S. Cl. 260—448.2 N     7 Claims

ABSTRACT OF THE DISCLOSURE

Aromatic o-triorganosilyl-diorganoamino compounds of the formula

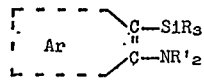

where Ar is aromatic and process for making by reacting a compound of the formula

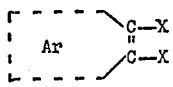

where X is halogen and a lithium alkyl, or a compound of the formula

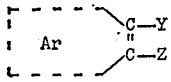

where Y and Z are cleavable atoms or groups, in an inert solvent and in an inert atmosphere with a compound of the formula $R_3SiNR'_2$. The novel compounds are useful for the preparation of dyes of the triphenylmethane series.

---

The present invention relates to a process for preparing aromatic o-triorganosilyl-diorganoamino compounds and to the compounds of the general formula (I) 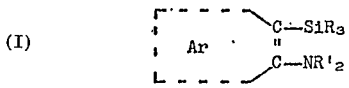

in which R and R' signify hydrocarbon groups, two groups R or R' taken together with their silicon atom or nitrogen atom, respectively, a heterocyclic group and Ar a possibly substituted aromatic nucleus derived from an aromatic compound able to undergo o-dehydrogenation. Usually the R and R' groups will have not more than 24 carbon atoms and for some uses not more than 8.

The electrophilic or nucleophilic addition of various compounds such as metal halides, e.g., $HgI_2$ and $HgCl_2$, metalloid halides, e.g., $PCl_3$, organometal halides, e.g., $C_6H_5HgCl$ and $(n-C_4H_9)_3SnCl$, organometalloid halides, e.g., $(CH_3)_3SiCl$ and organic silanes, e.g., $(CH_3)_3SiH$ to aromatic o-dehydro compounds, especially o-dehydrobenzene, is well known. It has also been known to react aliphatic ditertiary diphosphines such as, e.g., tetraethyldiphosphine with a o-dehydrobenzene, whereby the corresponding 1,2-bis-(dialkylphosphino)-benzenes are formed by cleavage of the P—P bond. However, with hexaalkyldisilanes an analogous reaction cannot be achieved. No formation of the corresponding 1,2-bis-(trialkylsilyl)-benzenes occurs.

Now it has been found that the aromatic o-dehydro compounds described above are obtained, when an equimolar mixture of a compound of the general formula (II) 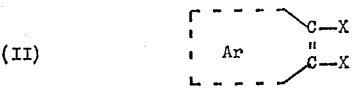

in which Ar has the same significance as above and X signifies a halogen atom, and of a lithium alkyl, is reacted in an inert solvent and in an inert atmosphere with a pentaorganosilazane of the general formula (III)     $R_3SiNR'_2$ in which R and R' have the same significance as above.

It is known that in this reaction an intermediate compound of the formula (IV) 

arises, which depending on its stability is converted more or less rapidly to the corresponding o-dehydro compound by splitting off lithium halide. The stability depends in this case on the kind of the halogen atom, the speed of conversion and the temperature.

A large number of such compounds are known which can convert to a corresponding o-dehydro compound. These are also suited for the process of invention and can be expressed by the general formula (V) 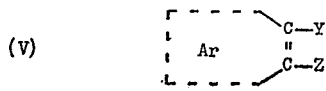

in which Ar has the same significance as above and Y and Z signify atoms or groups cleavable under the conditions of reaction.

The process of invention probably comprises the reaction of an o-dehydro compound of the general formula (VI) 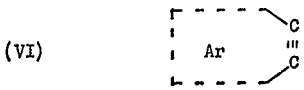

in which Ar has the same significance as above, with the pentaorganosilazane (III).

Examples of o-dehydro compounds which occur in the reaction and react with a pentaorganodisilazane by formation of the products of invention are 1,2-dehydrobenzene, 3,4-dehydrotoluene, 2,3-dehydro-1,4-xylene, 1,2-dehydronaphthalene, 2,3-dehydro-1-methylnaphthalene, 9,10-dehydrophenanthrene, 1,2-dehydro-1,4-dimethoxybenzene, 4,5-dehydroveratrole, 2,3-dehydrotrifluoromethylbenzene, 2,3-dehydro-N,N-dimethylaniline and 2,3-dehydroanisole.

In general, the aromatic o-dehydro compounds are unstable compounds. They can be prepared from the starting compounds (V) at low temperatures, e.g., −120 to −75° C. in an inert solvent, e.g., ether, tetrahydrofuran, benzene etc., and reacted immediately with the silazane (III), the temperature being increased gradually up to the room temperature, or higher temperature, e.g., boiling point of the solvent employed. If the stability of the starting compound is greater, all reactants can be reacted simultaneously, e.g., at room temperature.

The starting compound (V) expediently is selected so that the cleavable atoms or groups Y and Z, or the by-product YZ formed from these will be inert towards the silazane (III) being reacted. The reactivity of the o-dihalogeno compounds (II) in the reaction with a lithium alkyl is directed by the kind of the halogen atoms present. Dichloro derivates are, for example, less reactive than chloro-fluoro derivates or bromo-fluoro derivates, because the intermediate compounds (IV) where the halogen atom is a fluorine atom convert easily to the corresponding o-dehydro compound.

Examples of suitable lithium alkyls are t-butyl lithium, isopropyl lithium, n-butyl lithium, phenyl lithium and methyl lithium.

It has been found that on reacting dichloro derivatives with a lithium alkyl there is formed besides the expected o-triorganosilyl-diorganoamino compound about an equal quantity of this compound containing a chlorine atom in the aromatic nucleus. Apparently, the cleavable atom Y or Z of the compound (V) can also be a hydrogen atom, because the metallation of o-haloaryl anions is well known. The reaction is expediently carried out excluding moisture in an inert atmosphere.

A large number of the pentaorganosilazanes utilizable herein also are well known. Examples are pentamethylsilazane, pentaethylsilazane, penta-n-propylsilazane, and pentaphenylsilazane. Of course, the organic groups on the silicon atom and nitrogen atom can be different as in, for example, dimethylamino-triphenylsilane and diphenyl-amino-trimethylsilane. The two organic groups on the nitrogen atom taken together with their nitrogen atom can form a heterocyclic group such as in, for example, pyrrolidino-trimethylsilane, piperidino-triethylsilane and morpholino-triphenylsilane. In similar manner also two organic groups on the silicon atom taken together with their silicon atom can form a heterocyclic group such as, for example, 1-di-n-butylamino-1-methyl-silacyclopentane, 1-octyl-methylamino-1-propyl-silacyclohexane and 1-pyrrolidino-1-phenyl-silacycloheptane. Thus, if for the sake of simiplicity pentaorganosilazane is mentioned, such compounds are included with the term "penta" and all valences of silicon atom and nitrogen atom are occupied by organic groups.

The compounds obtainable according to the instant process have not been known until now. They can be used instead of well known bases such as dimethylaniline, diethylaniline, diethylnaphthalene, N - methyl - pyrrolidine, N-didecylpiperidine, N-octylmorpholine etc. They are different from these bases by the presence of a triorganosilyl group in the aromatic nucleus which, in general, considerably increases their liquid range.

The novel compounds can still undergo in the para position coupling reactions as usual for such tertiary bases and be useful for the preparation of, for example, dyes of the triphenylmethane series.

EXAMPLE 1

In a liter three-necked flask with dropping funnel, stirrer and condenser there are dissolved 43.8 g. (0.25 mole) of o-bromo-fluorobenzene in 200 ml. of diethyl ether. The solution is cooled to −75° C. and with stirring there are slowly added dropwise 0.25 mole of butyl lithium. Stirring is continued at this temperature for 30 minutes and subsequently there are added 54.3 g. (0.375 mole) of $(CH_3)_3SiN(C_2H_5)_2$. The mixture is slowly brought to room temperature with stirring and then boiled for 30 minutes. All volatile components are distilled off at 20–35° C./0.1 mm. To the residue is added hexane and the solution filtered over "Cellit" filter aid. The filtrate is concentrated and subjected to a crude distillation at 11 mm. The fraction distilling between 100 and 170° C. at 11 mm. is fractionated again.

Yield (calculated on o-bromo-fluorobenzene) 19.5 g. (35%) of 1-trimethylsilyl-2-diethylaminobenzene: B.P. 119° C./4 mm., $n_D^{20}$ 1.5119.

$C_{13}H_{23}NSi$.—Calc'd (percent): C, 70.52; H, 10.47; N, 6.33; Si, 12.68. Molecular weight 221.4. Found (percent): C, 70.83; H, 10.38; N, 6.14; Si, 12.11. Molecular Weight 218.

$N^1NMR$ spectrum: in $CCl_3D$ against TMS. Si—$CH_3$ 9.71γ (singlet), —$CH_3$ 9.02γ (triplet), —$CH_2$— 7.08γ (quartet), $C_6H_4$ 2.44–3.09γ (multiplet). Intensities: 9:6:4:4.

EXAMPLE 2

As described in Example 1 there are reacted simultaneously 33.7 g. (0.230 mole) of 1,2-dichlorobenzene, 0.23 mole of butyl lithium and 49.4 g. (0.34 mole) of $(CH_3)_3SiN(C_2H_5)_2$. The reaction proceeds at about room temperature. Yield (based on o-dichlorobenzene) 10.5 g. (20.7%) of 1-trimethylsilyl-2-diethylaminobenzene. Also, the corresponding compound which is chlorinated in the nucleus is isolated. Yield 10.45 g.; B.P. 142° C./11 mm., $n_D^{20}$ 1.5291.

$C_{13}H_{22}NSiCl$.—Calc'd (percent): C, 61.02; H, 8.67; N, 5.47; Si, 10.98; Cl, 13.86. Mol. weight 255.87. Found (percent): C, 61.20; H, 8.94; N, 5.68; Si, 10.13; Cl, 12.81. Mol. weight 245.

$H^1NMR$ spectrum: in $CCl_3D$ against TMS. Si—$CH_3$ 9.56γ (singlet), —$CH_3$ 9.08γ (triplet), —$CH_2$— 7.03γ (quartet), $C_6H_3Cl$ 2.64–3.17γ (multiplet). Intensities: 9:6:4:3.

What I claim is:

1. A process for preparing aromatic o-triorganosilyl-diorganoamino compounds of the formula

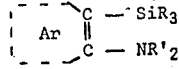

in which R and R' signify hydrocarbon groups having not more than eight carbon atoms and Ar is an aromatic nucleus derived from an aromatic compound able to undergo o-dehydrogenation, characterized in that an equimolar mixture comprising a compound of the formula

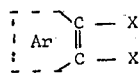

in which Ar has the same significance as above and X signifies a halogen atom, and of a lithium alkyl are reacted in an inert solvent and in an inert atmosphere with a pentaorganosilazane of the formula

$R_3SiNR'_2$ in which R and R' have the same significance as above.

2. A process of claim 1 wherein R is methyl, R' is ethyl, butyl lithium is the lithium alkyl, one X is a bromo atom the other is a fluoro atom, and the Ar ring is a benzene ring.

3. A process of claim 1 wherein R is methyl, R' is ethyl, butyl lithium is the lithium alkyl, both X's are chloro atoms, and the Ar ring is a benzene ring.

4. An aromatic o-triorganosilyl-diorganoamino compound of the formula

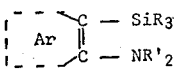

in which R and R' signify hydrocarbon groups having not more than eight carbon atoms and Ar is an aromatic nucleus derived from an aromatic compound able to undergo o-dehydrogenation.

5. A compound of claim 4 wherein R and R' are alkyl, and Ar is the benzene ring.

6. A compound of claim 5 wherein R is methyl and R' is ethyl.

7. A compound of claim 4 wherein R is methyl, R' is ethyl, and Ar is a benzene ring having a chlorine atom attached thereto.

References Cited

UNITED STATES PATENTS

| | | | |
|---|---|---|---|
| 2,960,517 | 11/1960 | Schnabel | 260—448.2 N |
| 3,103,529 | 9/1963 | Tambroski et al. | 260—448.2 N |
| 3,249,535 | 5/1966 | Keil | 260—448.2N X |
| 3,350,311 | 10/1967 | Napoli | 260—448.2N X |
| 3,505,376 | 4/1970 | Frankel et al. | 260—448.2 N |

TOBIAS E. LEVOW, Primary Examiner
P. F. SHAVER, Assistant Examiner

U.S. Cl. X.R.

260—247, 293 R, 326.8, 386, 389, 448.2 E

UNITED STATES PATENT OFFICE
CERTIFICATE OF CORRECTION

PATENT NO. : 3,641,088
DATED : February 8, 1972
INVENTOR(S) : Walter Fink

It is certified that error appears in the above-identified patent and that said Letters Patent are hereby corrected as shown below:

"AROMATIC O-TRIORGANOSILYLDIORGANOAMINO COMPOUNDS AND PROCESSES"
Walter Fink, Ruschlikon/ZH, Nidelbadstr.99, Zurich Switzerland, assignor to Monsanto Company, St. Louis, MO 63166, a Corp. of Delaware Signed and Sealed this thirtieth Day of December 1975

[SEAL]

Attest:

RUTH C. MASON
Attesting Officer

C. MARSHALL DANN
Commissioner of Patents and Trademarks